United States Patent [19]
Naito

[11] Patent Number: 5,510,922
[45] Date of Patent: Apr. 23, 1996

[54] OPTICAL FREQUENCY STABILIZER AND OPTICAL FREQUENCY SELECTOR

[75] Inventor: Takao Naito, Kawasaki, Japan

[73] Assignee: Fujitsu Limited, Kawasaki, Japan

[21] Appl. No.: 458,678

[22] Filed: Jun. 2, 1995

[30] Foreign Application Priority Data

Jun. 28, 1994 [JP] Japan .................................. 6-146186

[51] Int. Cl.⁶ .................................................. H04J 14/02
[52] U.S. Cl. .......................... 359/124; 359/134; 359/187; 372/32; 372/24
[58] Field of Search .................................. 359/124, 134, 359/158, 160–162, 182, 187; 372/24, 32

[56] References Cited

U.S. PATENT DOCUMENTS 5,068,864  11/1991  Javan ......................................... 372/32

FOREIGN PATENT DOCUMENTS 0521514  1/1993  European Pat. Off. ............... 359/124
2-293826  12/1990  Japan .
0021936  1/1991  Japan ..................................... 359/124
5347606  12/1993  Japan ..................................... 359/124

*Primary Examiner*—Leo Boudreau
*Assistant Examiner*—Kinfe-Michael Negash
*Attorney, Agent, or Firm*—Staas & Halsey

[57] ABSTRACT

An optical frequency stabilizer comprises a signal light source for outputting signal light of a frequency $f_s$; a frequency shifter having a pumping light source to emit pumping light of a frequency $f_p$ and producing converted signal light of a frequency $2f_p-f_s$ from the signal light supplied thereto; a frequency discriminator for converting a frequency change of the received converted signal light into an intensity change; an optical detector for producing a detection signal in response to the output light of the frequency discriminator; an oscillator for outputting a low-frequency signal; a modulator circuit for frequency-modulating the signal light source in accordance with the low-frequency signal; a synchronous detector circuit connected operatively to the oscillator and the optical detector; an inverter circuit for inverting the output characteristic of the synchronous detector circuit; and a control circuit for controlling the signal light source in such a manner as to maintain constant the output level of the synchronous detector circuit. This optical frequency stabilizer has high frequency stability.

10 Claims, 13 Drawing Sheets

OPTICAL FREQUENCY STABILIZER AND OPTICAL FREQUENCY SELECTOR

BACKGROUND OF THE INVENTION

1. Field of the Invention

The present invention relates to an optical frequency stabilizer and an optical frequency selector which are adapted for application in a wide field inclusive of multiplex optical communication in an optical frequency region and also optical interchange, optical cross connection and optical operation processing at optical frequencies.

2. Description of the Related Art

With regard to the technology of multiplex optical communication, optical interchange, optical cross connection and optical operation processing in an optical frequency region, discussion is currently in progress on the technique of simultaneously stabilizing a multiplicity of optical frequencies and further on the technique of selectively extracting optical frequencies. In a multiplexing system used in the optical frequency region, a function of wavelength conversion is an extremely important technique. As a device having such a function of wavelength conversion, there is proposed a frequency shifter which performs a process of four-light mixing(four-wave mixing). In a system equipped with a frequency shifter of this type, the phase of information of converted signal light is rendered inverse to information of signal light, so that unique optical frequency stabilization and optical frequency selection are requisite.

In the conventional frequency shifters having a function of wavelength conversion based on four-light mixing, there is known a type equipped with a pumping light source to emit pumping light of a frequency $f_p$ and producing converted signal light of a frequency of $2f_p - f_s$ from the signal light supplied thereto. Generally this frequency shifter further has a nonlinear optical medium which is supplied with both of the pumping light and the signal light, so as to perform four-light mixing by a high power of the pumping light.

In a system equipped with the frequency shifter mentioned above, when the frequency $f_s$ of the signal light and the frequency $f_p$ of the pumping light are stabilized to, e.g., ±100 MHz respectively under temperature control, the frequency stability of the converted signal light is ±300 MHz since the frequency thereof is $2f_p - f_s$. Therefore, the stability is more enhanced by directly stabilizing the frequency of the converted signal light.

Meanwhile the light output obtained from the frequency shifter after the four-light mixing includes signal light of frequency $f_s$, pumping light of frequency $f_p$, wavelength-converted signal light of frequency $2f_p - f_s$, and another wavelength-converted light of frequency $2f_s - f_p$. And it is necessary to select and extract merely the converted signal light of frequency $2f_p - f_s$ alone out of such four light components.

SUMMARY OF THE INVENTION

It is therefore an object of the present invention to provide an optical frequency stabilizer and an optical frequency selector adapted for application to a system equipped with a frequency shifter.

In the optical frequency stabilizer and the optical frequency selector of the present invention, there is employed a synchronous detection means for attaining a coincidence between the frequency of signal light and the peak frequency of a frequency discriminator or an optical filter. The signal light of a frequency $f_s$ is frequency-modulated by a low-frequency signal of a frequency $f_m$. In the optical frequency stabilizer for example, a frequency change of the signal light is converted into an intensity change by the frequency discriminator, and such intensity change is detected by an optical detector. The synchronous detection means has specific output characteristic corresponding to the frequency differential of the input/output characteristics of the frequency discriminator. When the signal light of a frequency $f_s$ has been frequency-modulated by the low-frequency signal of a frequency $f_m$, the converted signal light of a frequency $2f_p - f_s$ thus modulated is opposite in phase to the signal light. Consequently, when an opposite-phase frequency change of the converted signal light is inputted to the frequency discriminator, an intensity change outputted therefrom is also opposite in phase to the intensity change by the signal light.

In the present invention, an inversion means is provided for inverting the output characteristic of the synchronous detection means, thereby enabling control of a signal light source in such a manner as to maintain constant the output of the synchronous detection means. According to the present invention where such inversion means is incorporated for inverting the output characteristic of the synchronous detection means as described, it becomes possible to realize an optical frequency stabilizer and an optical frequency selector which are applicable to a system equipped with a frequency shifter therein.

In another optical frequency stabilizer according to the present invention, a pumping light source is so controlled as to maintain constant the output of a synchronous detection means. In this case, the pumping light source is frequency-modulated in accordance with a low-frequency signal. Consequently the frequency-modulated component of the pumping light source and that of the converted signal light have an in-phase relationship to each other to thereby eliminate the necessity of an inversion means in the synchronous detection means. The details thereof will be described later.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Hereinafter the preferred embodiments of the present invention will be described in detail with reference to the accompanying drawings.

Figure 1:
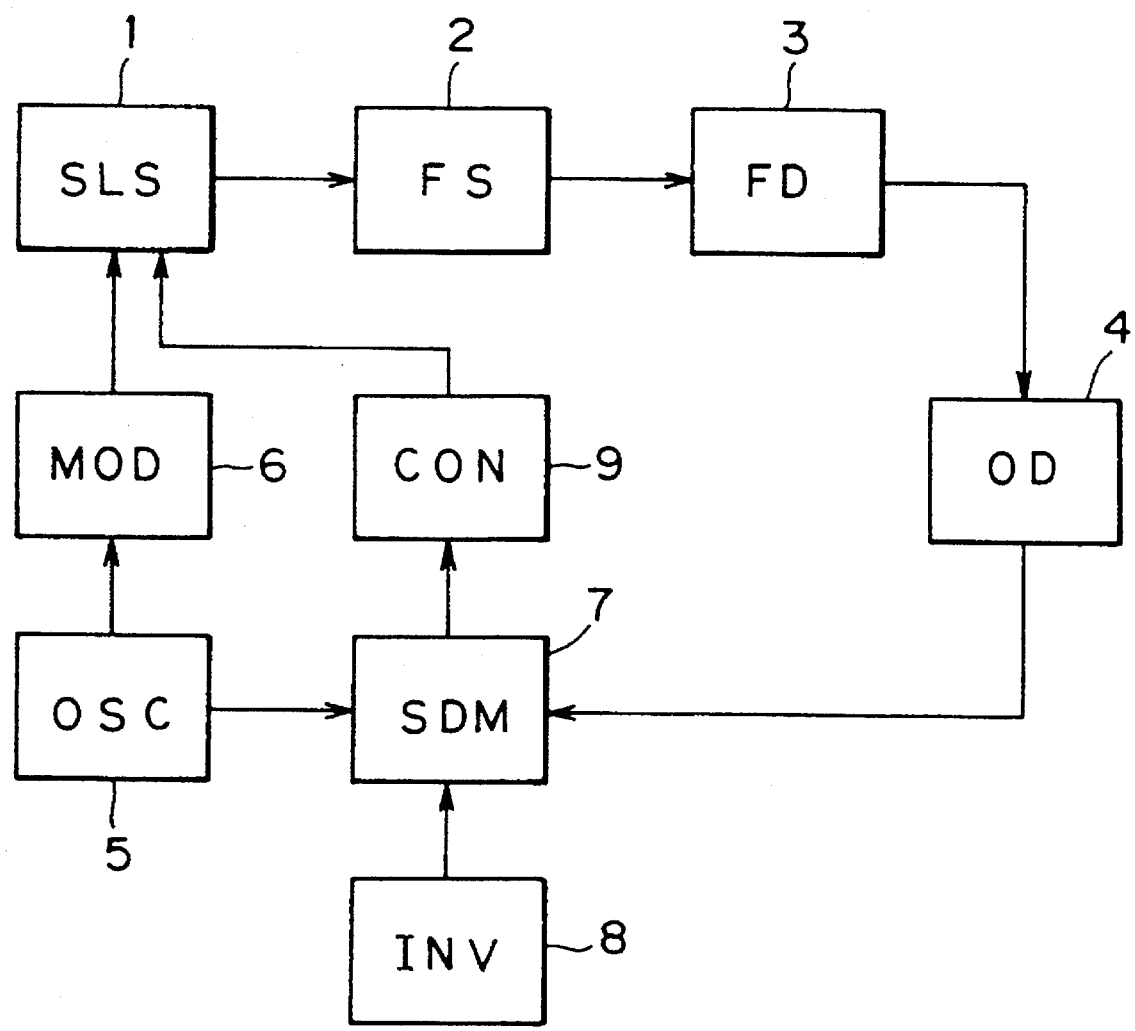
FIG. 1 is a block diagram showing a basic constitution of an optical frequency stabilizer of the present invention.

FIG. 1 is a block diagram showing a basic constitution of an optical frequency stabilizer according to the present invention. A signal light source 1 emits signal light of a frequency $f_s$. A frequency shifter 2 has a pumping light source to emit pumping light of a frequency fp and outputs converted signal light of a frequency $2f_p-f_s$ in response to the signal light supplied thereto. A frequency discriminator 3 has such input/output characteristics that a peak frequency thereof gives a maximum or minimum of the output intensity, and in response to the converted signal light supplied from the frequency shifter 2, converts any frequency change of the supplied signal light into an intensity change. An optical detector 4 receives the output light of the frequency discriminator 3 and produces a detection signal of a level corresponding to the intensity of the received light.

An oscillator 5 outputs a low-frequency signal of a frequency $f_m$, and a modulation means 6 serves to frequency-modulate the signal light source 1 in accordance with the low-frequency signal obtained from the oscillator 5. A synchronous detection means 7 is connected operatively to the oscillator 5 and the optical detector 4, and has specific output characteristic corresponding to the frequency differential of the input/output characteristics of the frequency discriminator 3. An inversion means 8 serves to invert the output characteristic of the synchronous detection means 7. And a control means 9 controls the signal light source 1 in such a manner as to maintain constant the output of the synchronous detection means 7.

Figure 2:
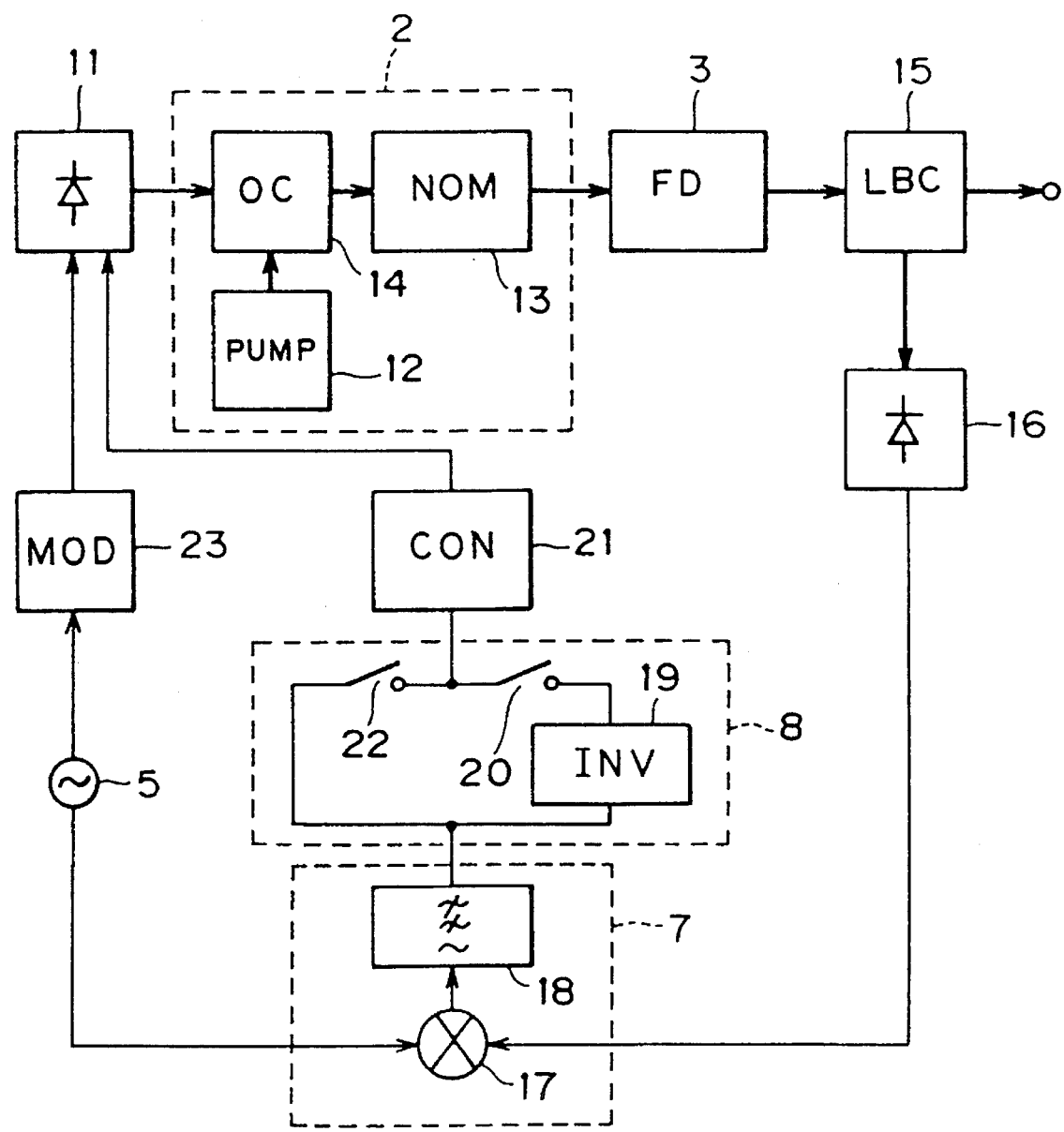
FIG. 2 is a block diagram showing a first embodiment of the optical frequency stabilizer according to the invention.

FIG. 2 is a block diagram of a first embodiment representing the optical frequency stabilizer of the present invention. Signal light emitted from a laser diode 11 as a signal light source is supplied to a frequency shifter 2. The frequency shifter 2 has a pumping light source 12 to emit pumping light, a nonlinear optical medium 13, and an optical coupler 14 connected optically to both of the pumping light source 12 and the nonlinear optical medium 13. The optical coupler 14 receives the signal light supplied from the laser diode 11 and introduces the same to the nonlinear optical medium 13 together with the pumping light emitted from the pumping light source 12. The nonlinear optical medium 13 may consist of an optical fiber or a semiconductor light amplifier. Upon supply of the signal light and the pumping light to the nonlinear optical medium 13, there is executed four-light mixing in the nonlinear optical medium 13 to consequently produce output light of a frequency different from the signal light frequency or the pumping light frequency either. The output light (converted signal light) from the nonlinear optical medium 13 is supplied to the frequency discriminator 3, whose output light is then branched by a light branch circuit 15. The light branch circuit 15 serves to branch the supplied light into at least two, and one of such branched light is supplied to a photo diode 16 employed as an optical detector, while the other is delivered to, e.g., a light transmission line.

The synchronous detection means 7 comprises a mixer 17 having first and second input ports and an output port, and a low-pass filter 18 connected to the output port of the mixer 17. The low-frequency signal obtained from the oscillator 5 is supplied to the first input port of the mixer 17, while the detection signal from the photo diode 16 is supplied to the second input port thereof. The output port of the low-pass filter 18 is connected to the input port of a control circuit 21 via an inverter circuit 19 and a switch 20, and the output port of the control circuit 21 is connected to the laser diode 11. The output port of the low-pass filter 18 is further connected directly to the control circuit 21 through a switch 22 without via the inverter circuit 19. A modulator circuit 23 performs frequency modulation of the laser diode 11 in accordance with the low-frequency signal obtained from the oscillator 5. This frequency modulation is executed in the modulator circuit 23 by superimposing, for example, the low-frequency signal on the bias current of the laser diode 11. The subject to be controlled by the control circuit 21 in this case is, e.g., the bias current of the laser diode 11. In another case, the temperature of the laser diode 11 may be controlled as well.

Figure 3:
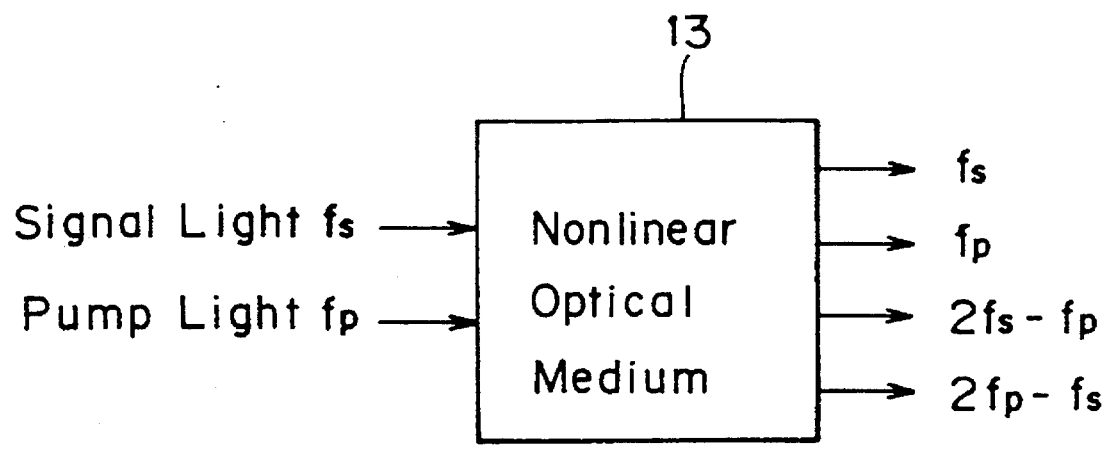
FIG. 3 is an explanatory diagram of a nonlinear optical medium.

Referring now to FIG. 3, an explanation will be given on wavelength conversion in the nonlinear optical medium. When the signal light of a frequency $f_s$ and the pumping light of a frequency $f_p$ are incident upon the nonlinear optical medium 13, four light outputs are obtained from this medium 13, i.e., the signal light of the frequency $f_s$, the pumping light of the frequency $f_p$, light of a frequency $2f_s-f_p$, and light of a frequency $2f_p-f_s$. If the pumping light is greater in power than the signal light, the light of the frequency $2f_s-f_p$ is slight in amount. Since the power of the pumping light is set to be greater in a general optical system, the light of the frequency $2f_p-f_s$ is considered to be important in this specification, and it is termed converted signal light herein.

Figure 4A:
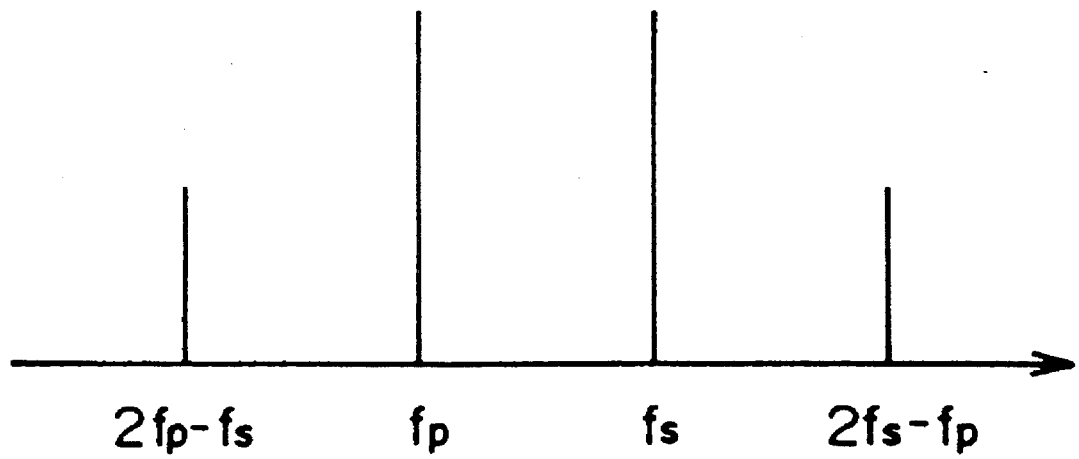
FIGS. 4A and 4B are explanatory diagrams of frequency arrangements.
Figure 4B:
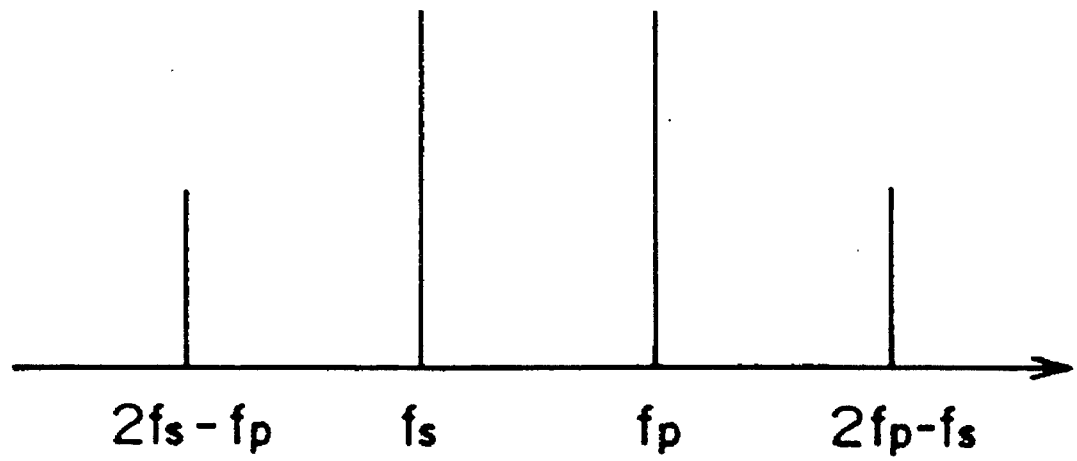

FIGS. 4A and 4B are explanatory diagrams showing frequency arrangements of light outputs obtained from the nonlinear optical medium 13 by the four-light mixing. In one case where the frequency of the signal light is higher than that of the pumping light, as shown in FIG. 4A, there appear the converted signal light of frequency $2f_p-f_s$, the pumping light of frequency $f_p$, the signal light of frequency $f_s$ and the light of frequency $2f_s-f_p$ on the frequency axis in this order. Meanwhile in another case where the frequency of the pumping light is higher than that of the signal light, as shown in FIG. 4B, there appear the light of frequency $2f_s-f_p$, the signal light of frequency $f_s$, the pumping light of frequency $f_p$ and the converted signal light of frequency $2f_p-f_s$ on the frequency axis in this order.

In either case, the signal light and the converted signal light are positioned symmetrical with respect to the pumping light. Therefore, assuming that the frequency of the pumping light remains unchanged, the frequency of the converted signal light is lowered in conformity with a rise of the frequency of the signal light, and the frequency of the converted signal light is raised in conformity with a fall of the frequency of the signal light. According to this principle, when the laser diode 11 is frequency-modulated in the stabilizer of FIG. 2 by the low-frequency signal obtained from the oscillator 5, the converted signal light supplied from the nonlinear optical medium 13 to the frequency discriminator 3 is also frequency-modulated, but the frequency-modulated component in the signal light and that in the converted signal light are mutually opposite in phase. This relationship is graphically shown in FIG. 5.

Figure 5:
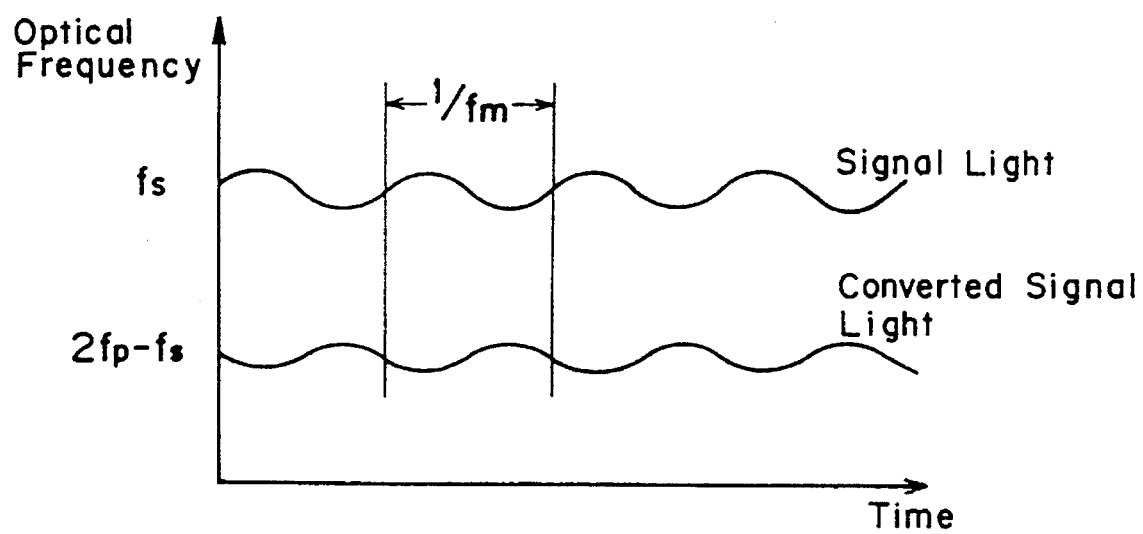
FIG. 5 is an explanatory diagram graphically showing frequency modulation of signal light and converted signal light.

In FIG. 5, the ordinate and the abscissa express an optical frequency and a time, respectively. The frequency of the signal light traces the waveform of the low-frequency signal with the lapse of time, centering at the frequency $f_s$. The period thereof is $1/f_m$. Meanwhile the converted signal light changes in an opposite-phase relation to the signal light, centering at the frequency $2f_p-f_s$. More specifically, the frequency-modulated component of the signal light and that of the converted signal light have a phase deviation of 180°.

Figure 6A:
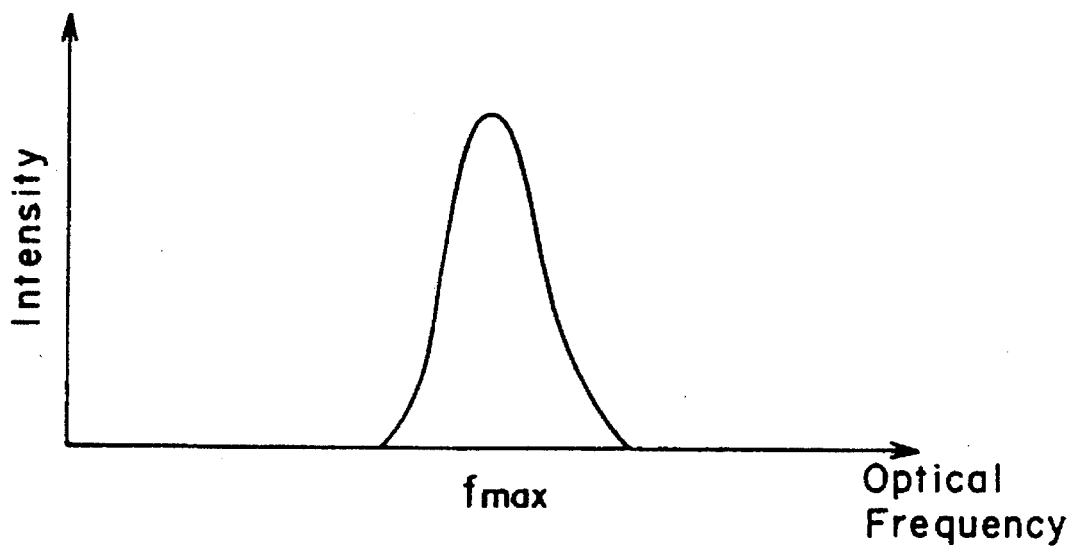
FIGS. 6A and 6B graphically show the input/output characteristics of a frequency discriminator and the output characteristic of a synchronous detection means, respectively.
Figure 6B:
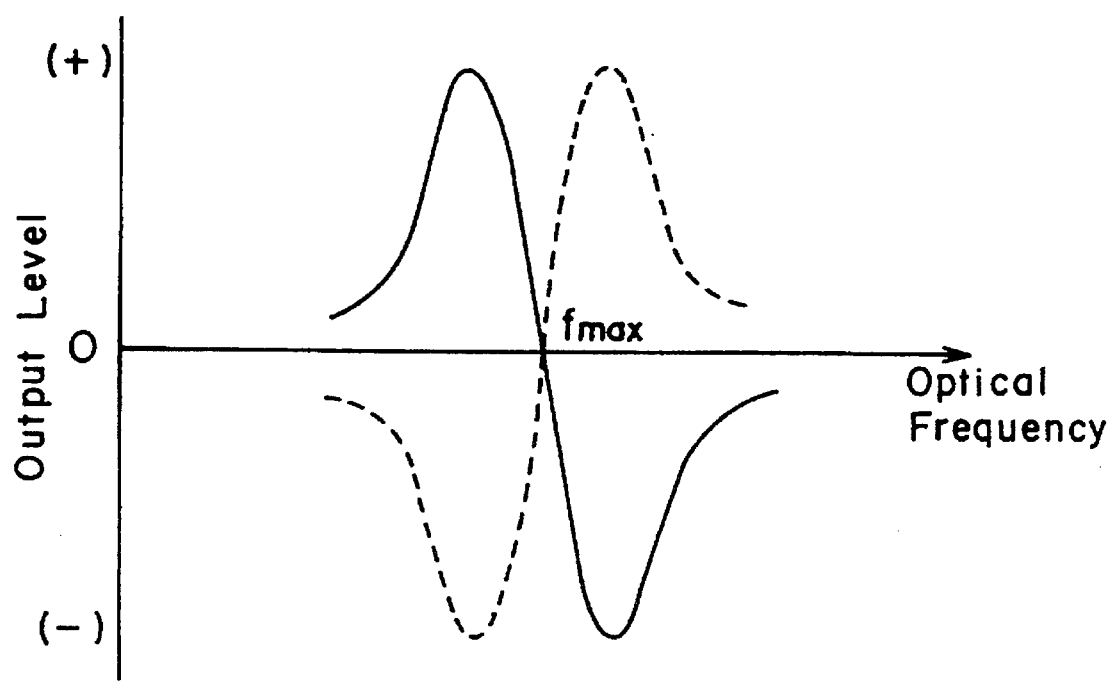

FIG. 6A shows the input/output characteristics of the frequency discriminator, and FIG. 6B shows the output characteristic of the synchronous detection means. In the input/output characteristics of the frequency discriminator, the abscissa expresses the frequency of the light supplied to the frequency discriminator, and the ordinate expresses the intensity of the light outputted from the frequency discriminator. In the output characteristic of the synchronous detection means, the abscissa expresses the optical frequency, and the ordinate expresses the output level of a DC signal outputted from the synchronous detection means. The DC signal is outputted from, e.g., a mixer 17 in FIG. 2 via a low-pass filter 18. In this embodiment, the input/output characteristics of the frequency discriminator have a peak frequency $f_{max}$ to give a maximum of the output intensity, and such characteristics can be attained by the use of a Fabry-Perot resonator for example. Meanwhile the output characteristic of the synchronous detection means corresponds to the frequency differential of the input/output characteristics of the frequency discriminator. More specifically, when the frequency of the converted signal light is coincident with the peak frequency $f_{max}$, the level of the DC signal becomes zero; whereas when no coincidence is obtained between them, a positive or negative DC signal corresponding to the difference is outputted.

It has been generally customary heretofore that, in any conventional system without a frequency shifter, the frequency of a signal light source is controlled in such a manner as to coincide with the peak frequency of a frequency discriminator by the use of the above-described synchronous detection means. In this process, the signal light source is so controlled as to render the DC signal zero. That is, when the DC signal is positive, a bias current of the signal light source is adjusted to raise the frequency of the signal light; whereas when the DC signal is negative, the signal light source is adjusted to lower the frequency of the signal light. Due to such feedback control, the frequency of the signal light is so controlled as to coincide with the peak frequency of the frequency discriminator.

In the present invention where a frequency shifter is employed, the frequency-modulated component of the signal light and that of the converted signal light are mutually in an opposite-phase relationship as explained with reference to FIG. 5. Therefore, even by direct application of the synchronous detection means to the present invention, it is impossible to attain a coincidence between the frequency of the converted signal light and the peak frequency of the frequency discriminator. For this reason, there is adopted an inversion means for inverting the output characteristic of the synchronous detection means. In the embodiment of FIG. 2, the inversion means is an inverter circuit 19 disposed between a synchronous detection means 7 and a control circuit 21. When a switch 20 connected to the inverter circuit 19 is turned on, the output characteristic of the synchronous detection means is inverted to be substantially equivalent to the one denoted by a broken line in FIG. 6B. Consequently, it becomes possible to execute such control as to zero the DC signal despite the mutual opposite-phase relationship between the frequency-modulated component of the signal light and that of the converted signal light.

When frequency stabilization is performed with regard to the signal light of frequency $f_s$ or the light of frequency $2f_s-f_p$ outputted from the frequency shifter 2, the switch 20 connected to the inverter circuit 19 is turned off, while a switch 22 for directly connecting the synchronous detection means 7 to the control circuit 21 is turned on. Then the output characteristic of the synchronous detection means 7 is changed substantially to the one denoted by a solid line in FIG. 6B, so that the known control is rendered executable.

In the present invention, frequency stabilization for the converted signal light is performed directly by using the synchronous detection means and the inversion means to consequently enhance the frequency stability in comparison with the conventional case where frequency stabilization is performed with respect to each of the signal light source and the pumping light source. More specifically, in an example where the frequency variation of the signal light and that of the pumping light are each ±100 MHz, the variation of the converted signal light is tripled to ±300 MHz; whereas in the present invention, the variation can be suppressed to ±100 MHz when the converted signal light is stabilized directly under control with the same precision.

Figure 7:
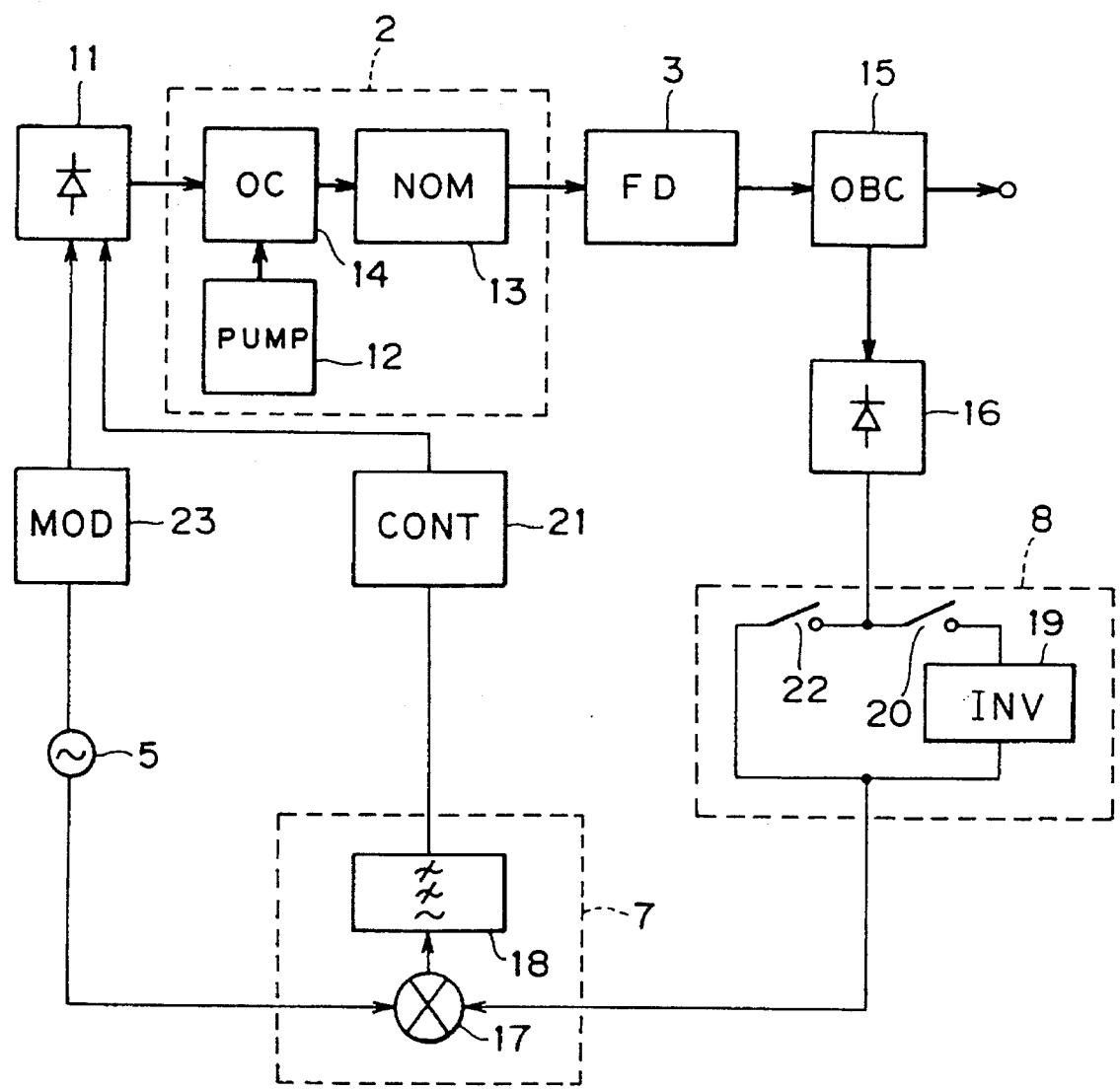
FIG. 7 is a block diagram showing a second embodiment of the optical frequency stabilizer according to the invention.
Figure 8:
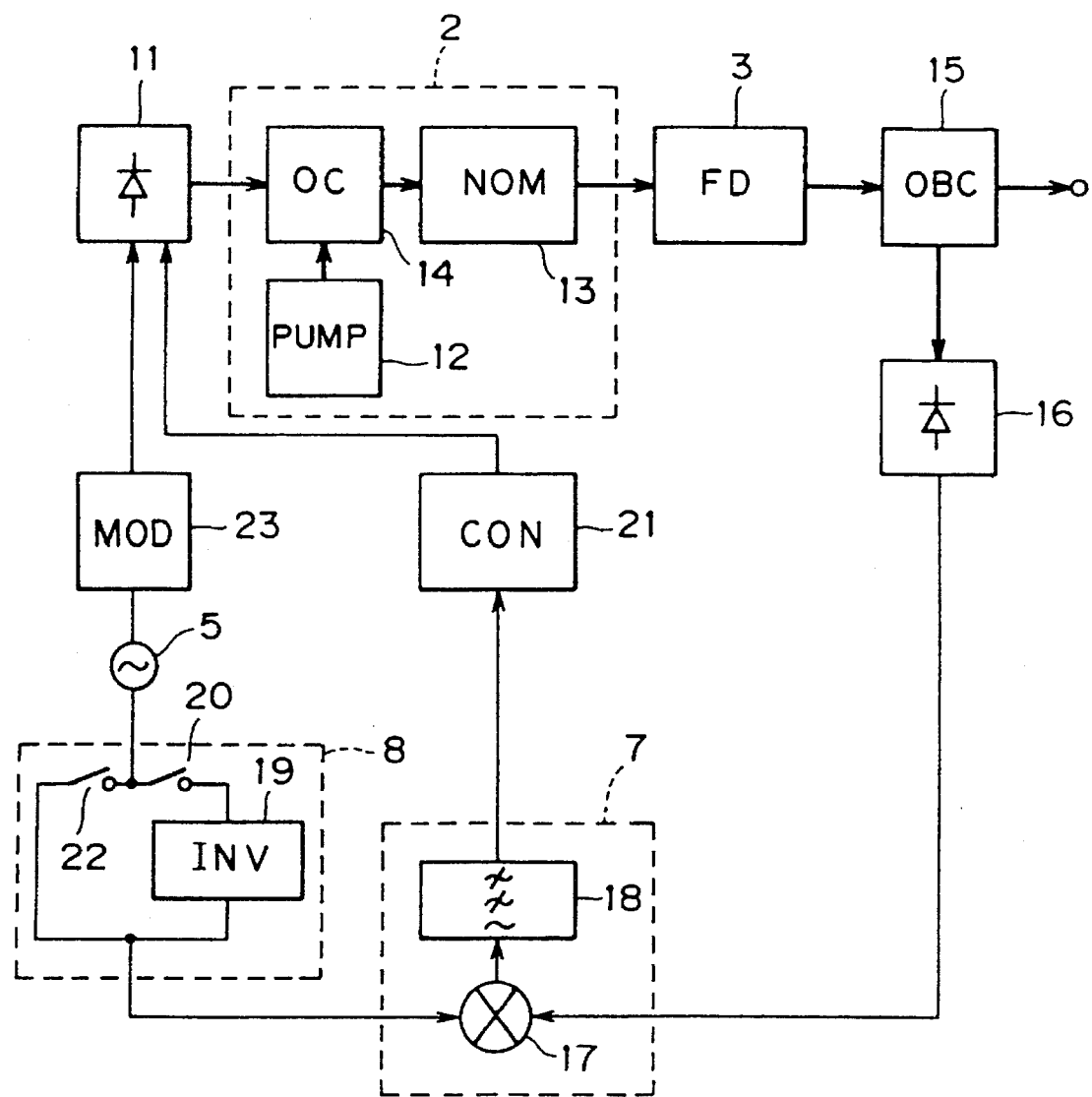
FIG. 8 is a block diagram showing a third embodiment of the optical frequency stabilizer according to the invention.
Figure 9:
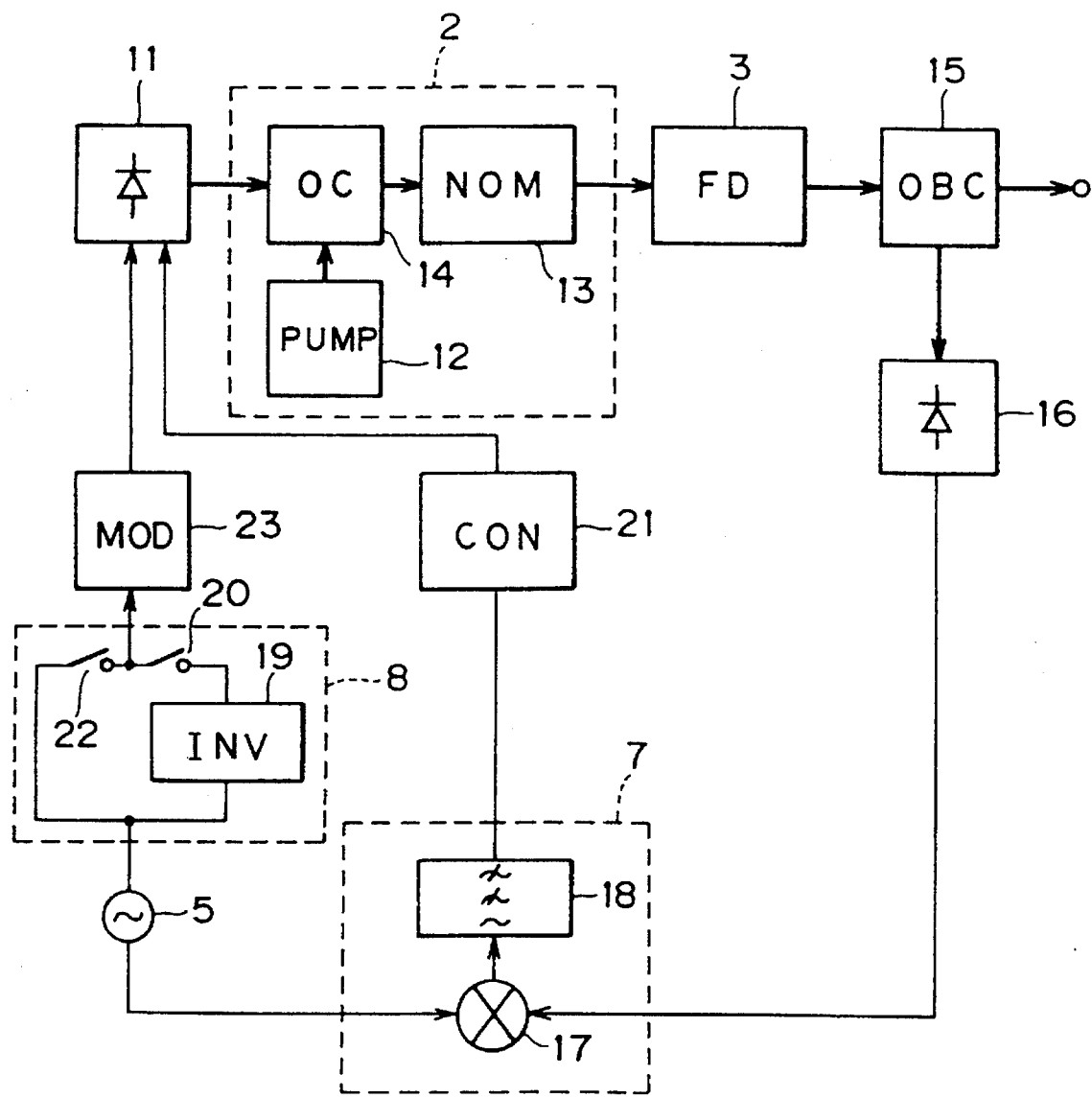
FIG. 9 is a block diagram showing a fourth embodiment of the optical frequency stabilizer according to the invention.

FIGS. 7, 8 and 9 are block diagrams of other embodiments each representing the optical frequency stabilizer of the present invention. In the second embodiment of FIG. 7, an inversion means 8 is disposed between a photo diode 16 and a synchronous detection means 7. Meanwhile in the third embodiment of FIG. 8, an inversion means 8 is disposed between an oscillator 5 and a synchronous detection means 7. And in the fourth embodiment of FIG. 9, an inversion means 8 is disposed between an oscillator 5 and a modulator circuit 23. In any of such embodiments, the output characteristic of the synchronous detection means 7 can be inverted with facility to eventually accomplish the object of the present invention, as in the aforementioned first embodiment of FIG. 2.

Figure 10:
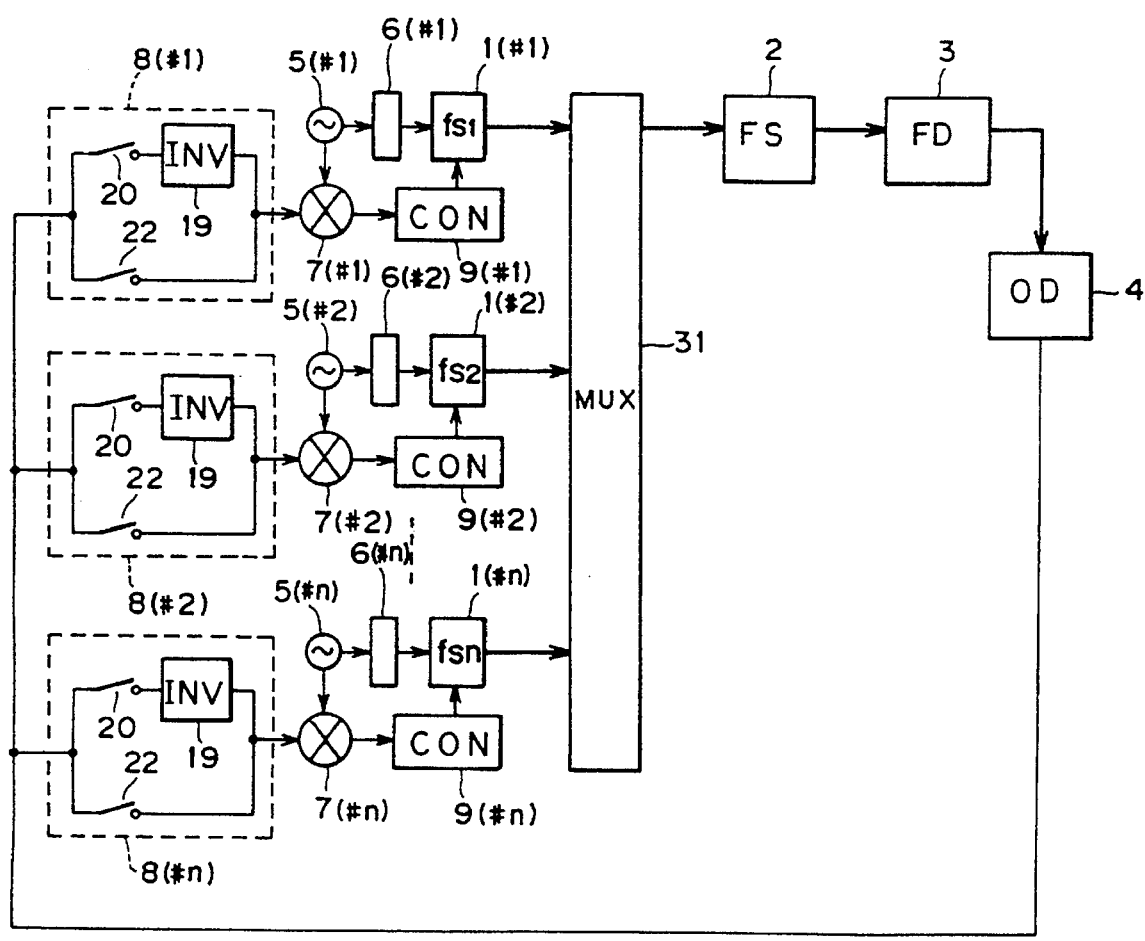
FIG. 10 is a block diagram showing a fifth embodiment of the optical frequency stabilizer according to the invention.

FIG. 10 is a block diagram of a fifth embodiment representing the optical frequency stabilizer of the present invention. It signifies an exemplary application of the present invention to optical frequency division multiplexing. In this embodiment are employed a plurality of signal light sources 1 (#1, #2, . . . , #n) which respectively emit signal light outputs of mutually different frequencies $f_{s1}$, $f_{s2}$, . . . , $f_{sn}$ (where n is a natural number). And an optical multiplexer 31 consisting of an optical coupler and so forth is provided for combining the signal light outputs of the signal light sources 1 (#1, #2, . . . , #n) and then supplying the combined light to a frequency shifter 2. Correspondingly to the signal light sources 1 (#1, #2, . . . , #n), there are further provided a plurality of oscillators 5 (#1, #2, . . . , #n), a plurality of modulation means 6 (#1, #2, . . . , #n), a plurality of synchronous detection means 7 (#1, #2, . . . , #n), a plurality of inversion means 8 (#1, #2, . . . , #n) and a plurality of control means 9 (#1, #2, . . . , #n). The other components are the same as those employed in the basic constitution of FIG. 1.

Figure 11:
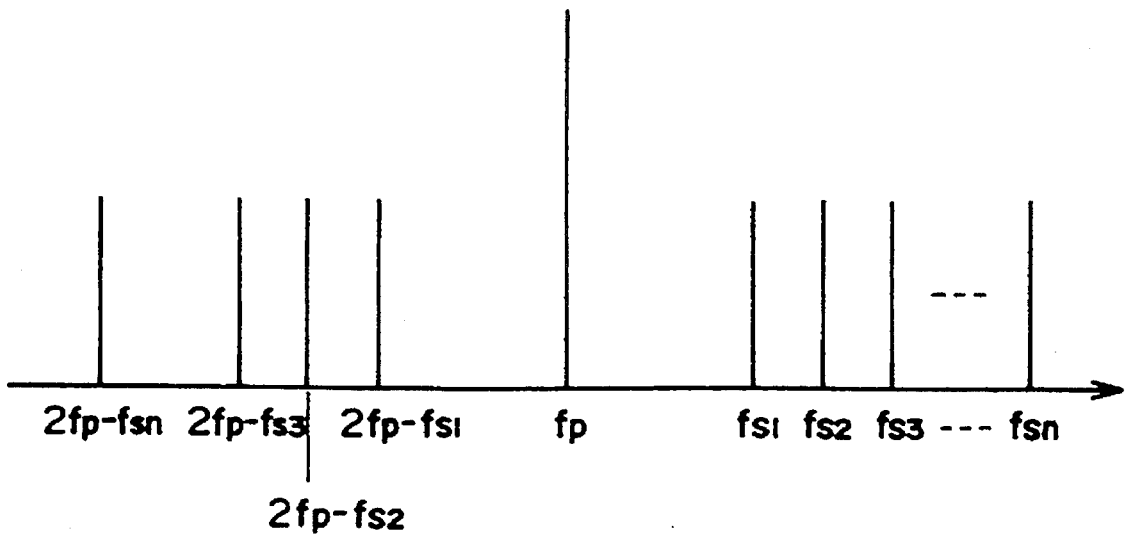
FIG. 11 is an explanatory diagram of a frequency arrangement of signal light, pumping light and converted signal light in the stabilizer of FIG. 10.

FIG. 11 shows an exemplary frequency arrangement of the signal light, the pumping light and the converted signal light in the stabilizer of FIG. 10. The frequency shifter 2 produces converted signal light outputs of frequencies $2f_p-f_{s1}, 2f_p-f_{s2}, \ldots, 2f_p-f_{sn}$ correspondingly to the signal light sources 1 (#1, #2, ..., #n). That is, as shown in FIG. 11, each signal light and the converted signal light corresponding thereto have, on the frequency axis, a mirror image relationship with the pumping light at the center. The frequency discriminator 3 has a plurality of mutually different peak frequencies in the input/output characteristics thereof correspondingly to the individual signal light sources. There is known a Fabry-Perot resonator usable as such frequency discriminator having a plurality of peak frequencies. In a Fabry-Perot resonator, peak frequencies appear approximately equidistantly on the frequency axis. Consequently, according to this embodiment, the frequencies of the individual converted signal lights can be stabilized substantially equidistantly on the frequency axis.

For enabling the individual synchronous detection means 7 (#1, #2, ..., #n) to function independently of one another, the oscillators 5 (#1, #2, ..., #n) output low-frequency signals of mutually different frequencies $f_{m1}, f_{m2}, \ldots, f_{mn}$ in correspondence respectively to the individual signal light sources. In this embodiment, the inversion means 8 (#1, #2, ..., #n) are disposed between the optical detector 4 and the individual synchronous detection means 7 (#1, #2, ..., #n) respectively. Each of the inversion means has an inverter circuit 19 and switches 20 and 22, as in the aforementioned embodiment. According to this fifth embodiment, it is possible to easily perform frequency stabilization of each converted signal light in a case where the frequency shifter is applied to an optical frequency division multiplexing system.

Figure 12:
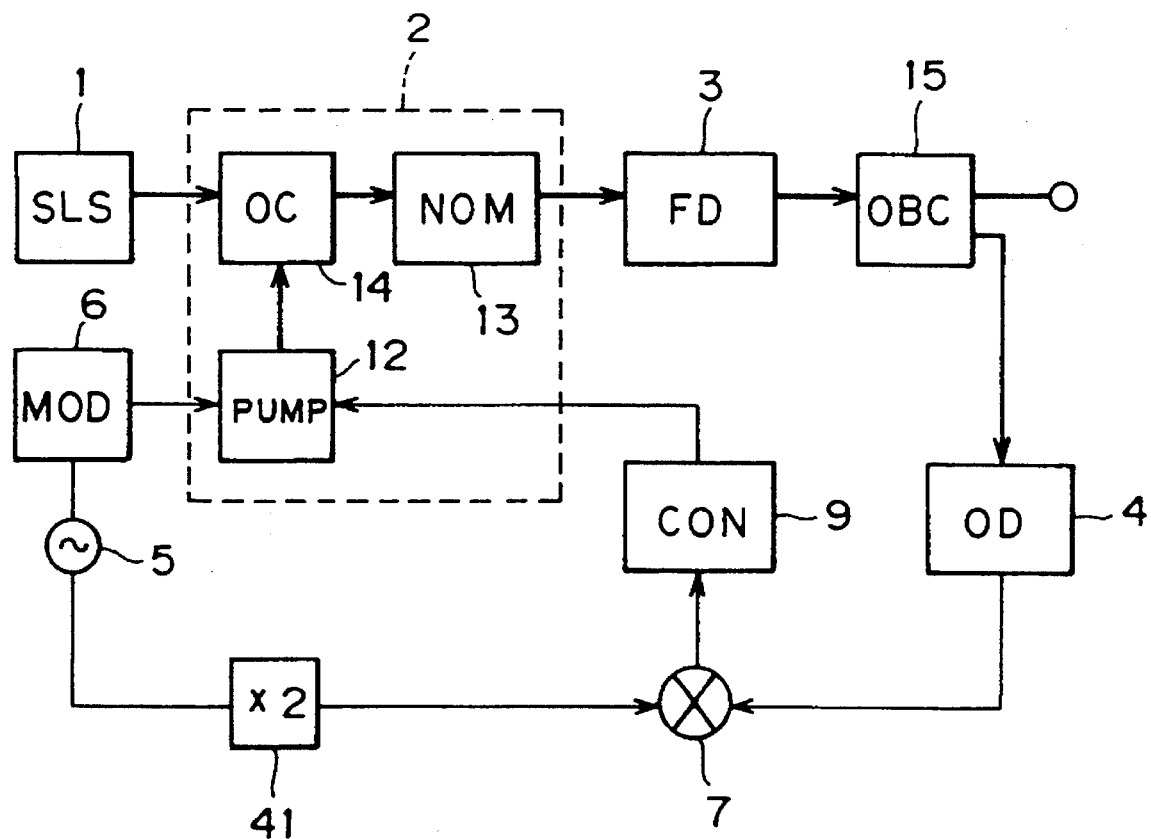
FIG. 12 is a block diagram showing a sixth embodiment of the optical frequency stabilizer according to the invention.

FIG. 12 is a block diagram of a sixth embodiment representing the optical frequency stabilizer of the present invention. This embodiment is characterized in that a modulation means 6 serves to frequency-modulate a pumping light source 12 in accordance with a low-frequency signal obtained from an oscillator 5, and a control means 9 controls the pumping light source 12 in accordance with the output of a synchronous detection means 7. Referring now to FIG. 4A, a study will be given with regard to the frequency variation of converted signal light in frequency modulation of pumping light. In frequency modulation of the signal light, the frequency-modulated component of the converted signal light has an opposite-phase relation to the frequency-modulated component of the signal light; whereas in frequency modulation of the pumping light, the frequency-modulated component of the converted signal light has an in-phase relation to the frequency-modulated component of the pumping light. In this embodiment, therefore, none of inversion means is required with respect to the synchronous detection means 7.

In this embodiment, a frequency doubler 41 is disposed between the oscillator 5 and the synchronous detection means 7. The frequency doubler 41 doubles the frequency of the low-frequency signal from the oscillator 5 and supplies the same to the synchronous detection means 7. In frequency modulation of the pumping light, the frequency-modulated component of the converted signal light has a period equivalent to half the period of the frequency-modulated component of the pumping light. This is obvious from the relationship between the frequency $f_p$ of the pumping light and the frequency $2f_p-f_s$ of the converted signal light. Accordingly, in order to execute frequency stabilization by synchronous detection, the frequency of the low-frequency signal, which is a frequency-modulated component of the pumping light, is doubled prior to supply of this signal to the synchronous detection means 7.

Figure 13:
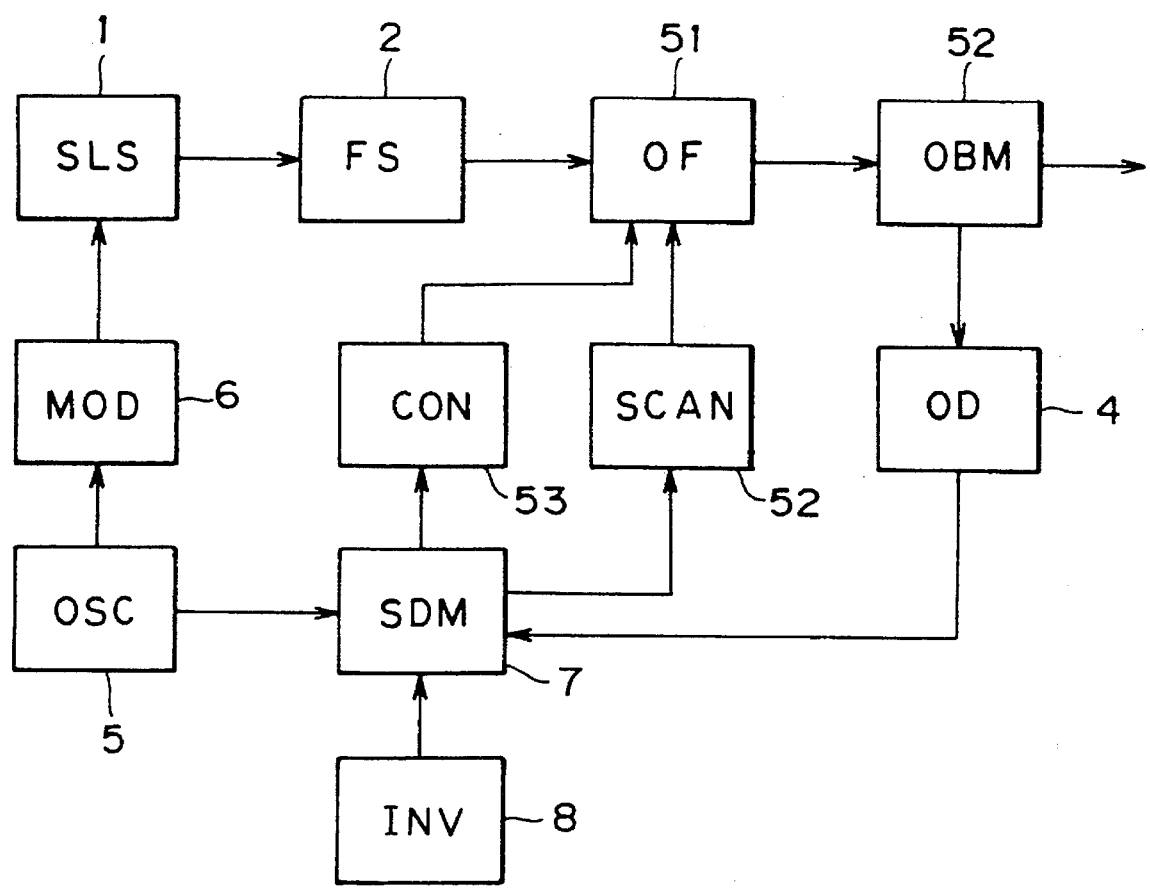
FIG. 13 is a block diagram showing a basic constitution of an optical frequency selector according to the invention.

FIG. 13 is a block diagram showing a basic constitution of an optical frequency selector according to the present invention. A signal light source 1 emits a signal light output of a frequency $f_s$. A frequency shifter 2 has a pumping light source to emit pumping light of a frequency $f_p$, and produces a converted signal light output of a frequency $2f_p-f_s$ from the signal light supplied thereto from the signal light source 1. The converted signal light thus outputted is then supplied to an optical filter 51, which has such band pass characteristic that a peak frequency for giving a maximum transmissivity is included. The band pass characteristic is variable on the frequency axis. A light branch means 52 receives the output light of the optical filter 51 supplied thereto and branches the same into at least two. An optical detector 4 receives one of the branched light and outputs a detection signal of a level corresponding to the received light.

An oscillator 5 outputs a low-frequency signal of a frequency $f_m$, and a modulation means 6 serves to frequency-modulate the signal light source 1 in accordance with the low-frequency signal obtained from the oscillator 5. A synchronous detection means 7 connected operatively to both of the optical detector 4 and the oscillator 5 has specific output characteristic corresponding to the frequency differential of the band pass characteristic of the optical filter 51. A scan means 52 connected operatively to both of the optical detector 4 and the optical filter 51 scans the band pass characteristic of the optical filter 51 and halts its scanning in response to a detection signal outputted from the optical detector 4. An inversion means 8 inverts the output characteristic of the synchronous detection means 7, and a control means 53 controls the band pass characteristic of the optical filter 51 in such a manner as to maintain constant the output of the synchronous detection means 7. The frequency shifter 2 produces light outputs of various frequencies as described with reference to FIG. 3 for example. The frequency selector of FIG. 13 is useful for selection of the converted signal light from such light outputs.

When the frequency of the converted signal light is included in the pass band of the optical filter 51 as a result of scanning the band pass characteristic of the optical filter 51 by the scan means 52, an output is delivered from the synchronous detection means 7. And then the scan means 52 halts its operation of scanning the band pass characteristic of the optical filter 51 in response to such output of the synchronous detection means 7. Thereafter the control means 53 functions to control the band pass characteristic of the optical filter 51 in such a manner that the output of the synchronous detection means 7 becomes zero. There is known a Fabry-Perot resonator applicable as an optical filter whose band pass characteristic is variable. The band pass characteristic is varied by adjusting the temperature of a Fabry-Perot resonator. Regarding the basic constitution of this optical frequency selector also, any of variations conforming to the above embodiments of the optical frequency stabilizer may be adopted.

According to the present invention, as explained above, there are attained remarkable effects that realize the provision of an optical frequency stabilizer and an optical frequency selector which are applicable to a system equipped with a frequency shifter.

Although the present invention has been described hereinabove on the basis of some preferred specific embodiments thereof, it is to be understood that they are merely illustrative and not restrictive at all. For example, the analog circuit employed for synchronous detection in any embodiment may be replaced with a digital circuit, and still a similar function is achievable. The scope of the present invention is defined in the appended claims, and any modifications and changes be- longing to equivalent bounds of the claims are embraced within the scope of the invention.

What is claimed is:

1. An optical frequency stabilizer comprising:

a signal light source for outputting signal light of a frequency $f_s$;

a frequency shifter having a pumping light source to emit pumping light of a frequency $f_p$ and producing converted signal light of a frequency $2f_p-f_s$ from said signal light supplied thereto;

a frequency discriminator having such input/output characteristics that a peak frequency for giving a maximum or minimum of the output intensity is included, and converting a frequency change of said converted signal light into an intensity change and outputting the same therefrom;

an optical detector supplied with the output light of said frequency discriminator and producing a detection signal of a level corresponding to the intensity of said output light;

an oscillator for outputting a low-frequency signal of a frequency $f_m$;

a modulation means for frequency-modulating said signal light source in accordance with said low-frequency signal;

a synchronous detection means connected operatively to both of said oscillator and said optical detector, and having specific output characteristic corresponding to the frequency differential of the input/output characteristics of said frequency discriminator;

an inversion means for inverting the output characteristic of said synchronous detection means; and a control means for controlling said signal light source in such a manner as to maintain constant the output of said synchronous detection means.

2. The optical frequency stabilizer according to claim 1, wherein said frequency shifter further has a nonlinear optical medium, and an optical coupler connected optically to both of said pumping light source and said nonlinear optical medium and serving to introduce said pumping light into said nonlinear optical medium together with said signal light.

3. The optical frequency stabilizer according to claim 1, wherein said synchronous detection means includes a mixer having a first input port supplied with said low-frequency signal, a second input port supplied with said detection signal, and an output port connected operatively to said control means, said mixer capable of delivering, from said output port, either a zero DC signal when the frequency of said converted signal light is coincident with said peak frequency, or a positive or negative DC signal corresponding to the difference between the frequency of said signal light and said peak frequency in case no coincidence is attained therebetween; and said control means controls said signal light source in such a manner that said DC signal becomes zero.

4. The optical frequency stabilizer according to claim 3, wherein said inversion means comprises of an inverter circuit disposed between said first input port and said oscillator.

5. The optical frequency stabilizer according to claim 3, wherein said inversion means comprises of an inverter circuit disposed between said second input port and said optical detector.

6. The optical frequency stabilizer according to claim 3, wherein said inversion means comprises of an inverter circuit disposed between said output port and said control means.

7. The optical frequency stabilizer according to claim 1, wherein said signal light source comprises of a plurality of signal sources to emit signal light outputs of mutually different frequencies $f_{s1}, f_{s2}, \ldots, f_{sn}$ respectively;

said frequency stabilizer further comprises an optical multiplexer for combining the signal light outputs emitted from said plurality of signal light sources and then supplying the same to said frequency shifter;

said frequency shifter produces converted signal light outputs of frequencies $2f_p-f_{s1}, 2f_p-f_{s2}, \ldots, 2f_p-f_{sn}$ in corresponding to said plurality of signal light sources respectively;

said frequency discriminator has a plurality of mutually different peak frequencies in the input/output characteristics thereof in correspondence to said plurality of signal light sources respectively;

said oscillator comprises a plurality of oscillators for outputting low-frequency signals of mutually different frequencies $f_{m1}, f_{m2}, \ldots, f_{mn}$ in correspondence to said plurality of signal light sources respectively; and a plurality of said modulation means, said synchronous detections means, said control means and said inversion means are provided in correspondence to said plurality of signal light sources respectively.

8. The optical frequency stabilizer according to claim 1, further comprising a light branch means supplied with the output light of said frequency discriminator and serving to branch the same into at least two, wherein one of said branched light is supplied to said optical detector.

9. An optical frequency stabilizer comprising:

a signal light source for outputting signal light of a frequency $f_s$;

a frequency shifter having a pumping light source to emit pumping light of a frequency $f_p$ and producing converted signal light of a frequency $2f_p-f_s$ from said signal light supplied thereto;

a frequency discriminator having such input/output characteristics that a peak frequency for giving a maximum or minimum of the output intensity is included, and converting a frequency change of said converted signal light into an intensity change and outputting the same therefrom;

an optical detector supplied with the output light of said frequency discriminator and producing a detection signal of a level corresponding to the intensity of said output light;

an oscillator for outputting a low-frequency signal of a frequency $f_m$;

a modulation means for frequency-modulating said signal light source in accordance with said low-frequency signal;

a frequency doubler for doubling the frequency of said low-frequency signal supplied thereto and outputting the double-frequency signal;

a synchronous detection means connected operatively to both of said frequency doubler and said optical detector, and having specific output characteristic corresponding to the frequency differential of the input/output characteristics of said frequency discriminator; and a control means for controlling said pumping light source in such a manner as to maintain constant the output of said synchronous detection means.

10. An optical frequency selector comprising:

a signal light source for outputting signal light of a frequency $f_s$;

a frequency shifter having a pumping light source to emit pumping light of a frequency $f_p$ and producing converted signal light of a frequency $2f_p-f_s$ from said signal light supplied thereto;

an optical filter supplied with said converted signal light and having specific band pass characteristic where a peak frequency for giving a maximum transmissivity is included, said band pass characteristic being variable on the frequency axis;

a light branch means supplied with the output light of said optical filter and serving to branch the same into at least two;

an optical detector supplied with one of the branched light and producing a detection signal of a level corresponding to the intensity of the supplied light;

an oscillator for outputting a low-frequency signal of a frequency $f_m$;

a modulation means for frequency-modulating said signal light source in accordance with said low-frequency signal;

a synchronous detection means connected operatively to both of said oscillator and said optical detector, and having specific output characteristic corresponding to the frequency differential of the band pass characteristic of said optical filter;

a scan means for scanning the band pass characteristic of said optical filter and halting its scanning operation in response to the output signal from said synchronous detection means;

an inversion means for inverting the output characteristic of said synchronous detection means; and a control means for controlling the band pass characteristic of said optical filter in such a manner as to maintain constant the output of said synchronous detection means.

* * * * *

UNITED STATES PATENT AND TRADEMARK OFFICE
CERTIFICATE OF CORRECTION

PATENT NO. : 5,510,922

DATED : April 23, 1996

INVENTOR(S) : Takao NAITO

It is certified that error appears in the above-indentified patent and that said Letters Patent is hereby corrected as shown below:

Column 1, line 6, delete "1."

Column 1, line 13, delete "2."

Signed and Sealed this

Ninth Day of July, 1996

Attest:

BRUCE LEHMAN

Attesting Officer     Commissioner of Patents and Trademarks